United States Patent
Klinger et al.

[11] 3,711,180
[45] Jan. 16, 1973

[54] OPTICAL SWITCHING AND VIDEO DEVICES USING ORGANO-SUBSTITUTED CARBORANES

[75] Inventors: Theodore J. Klinger, Oxford, Miss.; John R. Wright, Batesville, Ark.

[73] Assignee: The University of Mississippi, University, Miss.

[22] Filed: Aug. 24, 1971

[21] Appl. No.: 174,472

[52] U.S. Cl.............350/150, 179/5.4 BD, 350/157, 350/158
[51] Int. Cl...............................................G02f 1/26
[58] Field of Search......350/147, 150, 157, 160, 158; 178/5.4 BD

[56] References Cited

UNITED STATES PATENTS 3,501,219   3/1970   Caulfield.............................350/150

*Primary Examiner*—David Schonberg
*Assistant Examiner*—Paul R. Miller
*Attorney*—William D. Stones

[57] ABSTRACT

Optical switching and video devices using organo-substituted carboranes are disclosed. These devices comprise a pair of transparent electrodes containing an organo-substituted carborane between them. Located on either side of the transparent electrodes are a pair of crossed polarizers. A light beam is directed toward one polarizer and emerges from the other polarizer when an electric potential is applied to the transparent electrodes. When no electric potential is applied to the transparent electrodes light is not transmitted. The color of the light transmitted or passed depends on the intensity and duration of the electric potential applied.

18 Claims, 3 Drawing Figures

PATENTED JAN 16 1973          3,711,180

INVENTORS
THEODORE J. KLINGEN
JOHN R. WRIGHT

BY William D. Stokes
ATTORNEY

OPTICAL SWITCHING AND VIDEO DEVICES USING ORGANO-SUBSTITUTED CARBORANES

The invention described herein was made in the course of, or under, a contract with the U.S. Atomic Energy Commission.

BACKGROUND OF THE DISCLOSURE

This invention is directed to optical switching and video devices.

Various attempts have been made to provide devices suitable for use as optical switches. While some of these attempts have been somewhat successful, depending upon the application, others have been relatively unsuccessful. One of the major disadvantages of prior art optical switches is their relatively slow relaxation times from the electrical ordering caused by the application of a potential to the liquid crystals performing the switching function. As best understood, the slow relaxation times of liquid crystals (nematic, cholesteric and smetic) is due to their degrees of freedom. That is, because these crystals have translational degrees of freedom rather than rotational degrees of freedom they have relatively slow relaxation times. On the other hand, one material, nitrobenzene, having rotational degrees of freedom has been proposed for use in optical switches. However, nitrobenzene has certain other disadvantages which make it undesirable for such applications. For example, nitrobenzene is a liquid and, therefore, less condensed than other forms of matter. Because of its lack of density, it is not as susceptible to ordering by physical stresses (such as electric fields, for example) as is desirable.

Therefore, it is an object of this invention to provide new and improved optical switching devices.

It is also an object of this invention to provide optical switching devices that have rapid relaxation times from the electrical ordering caused by the application of electric potentials thereto.

It is another object of this invention to provide optical switching devices that include relatively dense switch materials easily susceptible to ordering by the application of electric fields thereto.

Various attempts have also been made to provide color oriented video devices suitable for displaying video information. One group of such devices incorporates a plurality of individual optical switches mounted in a mosaic array. While such devices have been proposed as substitutes for the cathode ray tube, because of various disadvantages, they have not been entirely successful in this regard. One such disadvantage has been the slow relaxation times of the materials being used.

Therefore it is yet another object of this invention to provide a new and improved video display device.

It is still another object of this invention to provide a new and improved color oriented video display device that is formed in a mosaic array and has a fast relaxation time.

SUMMARY OF THE INVENTION

In accordance with priciples of this invention, new and improved optical switches are provided. The optical switches of the invention comprises a pair of parallel arrayed transparent electrodes. Located between the electrodes is a an organo-substituted carborane compound. Thus, a sandwich structure is formed. Located on either side of the sandwich are a pair of crossed polarizers. A light beam is directed toward one of the polarizers along an axis generally at right angles to the sandwich. When a voltage is applied to the two transparent electrodes, the carborane compound rotates a portion of the light beam so that it passes through the second polarizer. The color of the light transmitted or passed depends on the intensity of the electric potential applied and on the duration of the applied potential. Hence, by controlling the application of power to the transparent electrodes an optical switch is provided. Moreover, the optical switch can be used to modulate the light so that light beams of different colors are passed, as desired.

In accordance with other principles of this invention, a plurality of optical switching devices of the foregoing nature are arrayed in a mosaic manner and individually controlled to provide a color oriented video display. In addition, light is directed toward the array via a fiber optic bundle. Moreover, in one form the carborane compound is a continuous sheet or layer formed on a continuous transparent electrode. The other electrode is separated into a plurality of units which are individually controlled.

In accordance with still further principles of this invention the organo-substituted carborane compound is either 1-vinyl-o-carborane or 1-ethyl-o-carborane.

From the foregoing brief summary of the invention, it will be appreciated that an optical switching device as well as other video type devices are provided by the invention. The optical switch can be a simple on-off optical switch or a modulated optical switch where the color transmitted relates to a particular switch "position", for example. Alternatively, a plurality of devices formed in accordance with the invention can be arrayed so that the video information can be displayed. Thus, the invention can be used as a color oriented "thin" television picture tube, for example.

BRIEF DESCRIPTION OF THE DRAWINGS

The foregoing objects and many of the attendant advantages of this invention will become more readily appreciated as the same becomes better understood from the following detailed description when taken in conjunction with the accompanying drawings wherein.

DESCRIPTION OF THE PREFERRED EMBODIMENTS

Prior to discussing the optical and video devices of the invention the following brief discussion of Organo-Substituted Carboranes suitable for use in these devices is presented. It has been discovered by the inventors that the purified monomers of 1-vinyl-o-carborane and 1-ethyl-o-carborane exhibit-a relatively high Kerr constant and fast relaxation time from electrical ordering. 1-vingyl-o-carborane can be highly purified by vacuum sublimation. 1-ethyl-o-carborane can be produced by the hydrogeration of 1-vinyl-o-carborane in a benzene solution using a 5 percent Pd on carbon catalyst. It can then be highly purified by vacuum sublimation. Vinyl organo-substituted carborane compounds are plastic crystalline in the temperature range of from 11° to 79°C and the ethyl organo-substituted carborane compounds are plastic cystalline in the temperature range of from 0° to 37°C.

As indicated above 1-vinyl-o-carborane and 1-ethyl-o-carborane exhibit a relatively high Kerr constant and fast relaxation times. The relaxation time from electrical ordering created by the application of an electrical stress to these compounds is many orders of magnitude greater than the usual nematic, cholesteric and smectic liquid crystals previously used in some optical and video devices of the type herein contemplated. As best understood, the fast relaxation time is due to the fact that 1-vinyl-o-carborane and 1-ethyl-o-carborane posess rotational degrees of freedom rather the translational degrees of freedom associated with the foregoing liquid crystals. In addition to their high Kerr constants which allow them to be electrically ordered and have fast relaxation times, 1-vinyl-o-carborane and 1-ethyl-o-carborane are chemically and thermally stable.

One other material that has been proposed for use in optical switches is nitrobenzene. While that material also exhibits a high Kerr constant and, thus, has rotational degrees of freedom, it is not as susceptible to ordering by electric field stress because it is less condensed than 1-vinyl-o-carborane and 1-ethyl-o-carborane both of which are wax like in the ambient temperature range setforth above, not liquid.

Figure 1:
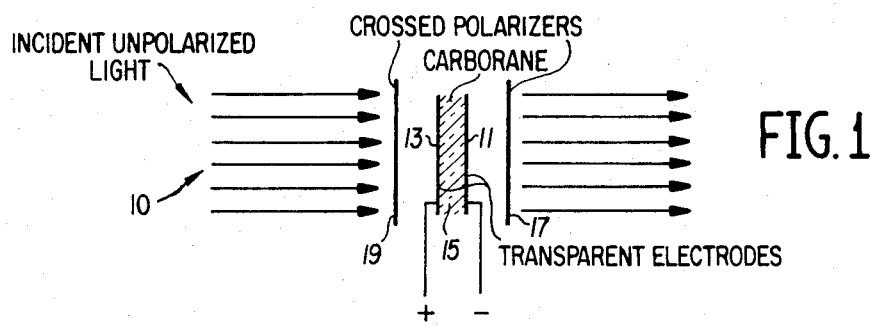
FIG. 1 is a cross-sectional diagram illustrating an optical switch formed in accordance with the invention.

Because of their high Kerr constant organo-substituted carboranes of the type described above have the ability to pass and stop polarized light. That is, in accordance with the invention, when carboranes of the foregoing nature are placed between crossed polarizers, they can control the passage of a beam of unpolarized light 10 through the polarizers because of their ability to be electrically ordered. More specifically, when 1-vinyl-o-carborane or 1-ethyl-o-carborane are placed between a pair of transparent electrodes 11 and 13 as illustrated in FIG. 1, and the electrodes are energized, the carborane controls the passage of light through crossed polarizers 17 and 19 located on the opposited sides of the electrodes. Thus, an optical switch is provided. That is, when zero potential is applied to the transparent electrodes no light is passed by the switch because the carborane does not affect the polarized light and, thus, the other polarizer prevents passage. On the other hand, when a electric potential is applied to the transparent electrodes light passes because the carborane 15 effects the light passed by the first or leftmost polarizer.

Turning now to a more specific description of the physical operation of the embodiment of the invention illustrated in FIG. 1, it will be understood by those skilled in the art that crossed polarizers normally will not pass light because each polarizer cuts out the light component passed by the other polarizer. On the other hand if the light passed by one polarizer is rotated prior to reaching the second polarizer, the second polarizer will pass some or all of the light depending upon the degree of rotation. The light passed will be color oriented if the input to the first polarizer is unpolarized light. Hence, by controlling the degree of "rotation" a color controlled output is provided. The carborane 15 located between he transparent electrodes 11 and 13 in FIG. 1 provides the desired controllable rotation. That is, by controlling the level and duration, of the potential applied to the transparent electrodes, the amount of rotation and, thus, the color passed is controlled by the carborane material.

It will be appreciated by those skilled in the art, that the switch illustrated in FIG. 1 can be modulated or controlled to provide a "positioning" as well as an on-off function. That is, the color of the light passed through the device illustrated in FIG. 1 depends upon the level of the electric potential applied to the transparent electrodes 11 and 13 and on the duration of the applied potential. Hence, by controlling one or both of these items different colors can be passed. The different colors can be applied through color filters to photocells, for example, to provide different outputs or switch "positions", as desired. Thus, the device is useful not only as a "on-off" switch but also as a switch to control a variety of functions or operations.

Figure 2:
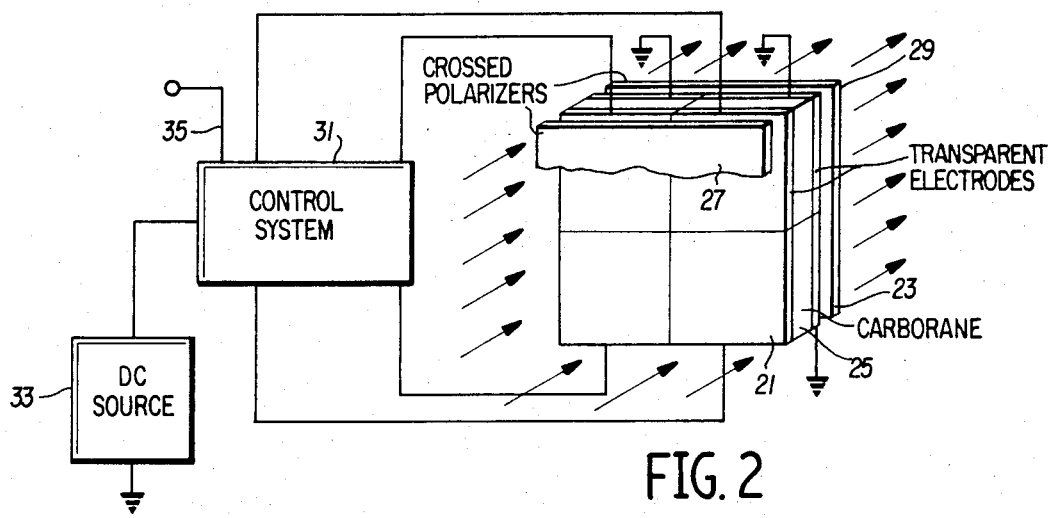
FIG. 2 is a perspective diagram illustrating a video display device formed in accordance with the invention.

In addition to providing an optical switch, the invention also provides a video display device when formed as illustrated in FIG. 2. For ease of understanding, FIG. 2 is greatly enlarged view of a four element video device. However, it will be understood by those skilled in the art that an actual device formed in accordance with the invention normally would include much smaller elements and many, many more of them so that a large mosaic array would be formed, the array being large enough to provide color oriented video picture, such as that displayed on a conventional cathode ray television tube, for example.

Four segments or structures of the type generally illustrated in FIG. 1 are shown arrayed in FIG. 2. Each structure comprises a rear transparent electrode 21 separated from a front transparent electrode 23 by a organo-substituted carborane 25. Further, front and rear crossed polarizers 27 and 29 are illustrated. In addition, a control system 31 is connected to each of the rear transparent electrodes 21. The control system 31 is connected to a DC source 33 and receives control signals via an input line 35. The front transparent electrodes 23 are all connected to ground, as is the other side of the DC source 33.

The control signals control the application of power from the DC source 33 to the rear transparent electrodes of the individual segments of the overall array. By controlling the time and/or duration of the applied electric potential, different colors are passed by each segment so that an overall video display or raster is provided by this embodiment of the invention. The control system may apply digital pulses to the segments for example, where either the height or the duration (or both) are controlled to provide the overall response desired. Moreover, rather than receiving an external signal, the control system 31 could internally generate these signals from a magnetic tape or other such source. Finally, the information could be directly applied from a suitable digital source, such as a computer, if desired.

Figure 3:
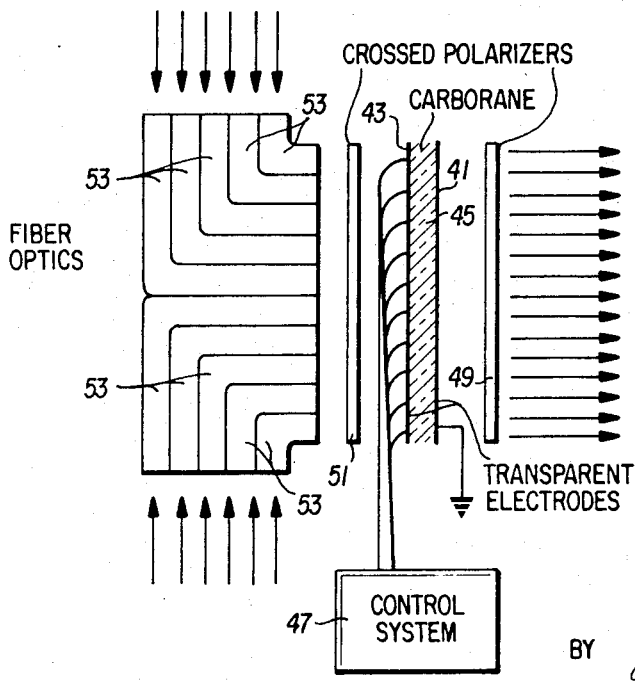
FIG. 3 is a cross-sectional diagram illustrating a further video display device formed in accordance with the invention.

FIG. 3 illustrates an alternative embodiment of a video display device formed in accordance with the invention. The device illustrated in FIG. 3 comprises a unitary transparent front electrode 41 separated from a segmented transparent rear electrode 43 by a organo-substituted carborane layer 45. More specifically, each segment (front electrode, carborane and rear electrode) of the array illustrated in FIG. 2 is entirely separated by a suitable insulation from every other segment. Contrawise, the array or device illustrated in FIG. 3 comprises a unitary front electrode 41 and a unitary carborane layer 45. Only the rear electrode 43 is segmented into separate segments insulated from one another. The front transparent electrode 41 is connected to ground and the segments of the rear transparent electrode 43 are connected to a control system 47. Since the control system operates, and may take on the forms previously discussed with respect to FIG. 2, it will not be further discussed here.

Located in front of the front transparent electrode 41 illustrated in FIG. 3 is a front polarizer 49 and located in back of the segmented rear transparent electrode 43 is a rear polarizer 51. The front and rear polarizers 49 and 51 are crossed and, hence, prevent the passage of light in the absence of a voltage being applied to the transparent electrodes. Located to the rear of the rear polarizer 51 are a plurality of fiber optical elements 53. The fiber optical elements transmit unpolarized light from a remote source or sources so that it strikes the rear polarizer 51 at right angles thereto. The passage of the light is controlled in the manner previously described by controlling the level and/or duration of the potential applied to the organo-substituted carborane compound via the transparent electrodes so that individual regions thereof display different colors. In this manner a color oriented video display is provided.

It will be appreciated by those skilled in the art and others from the foregoing description of the preferred embodiments of the invention, that the invention provides optical switches as well as a video display devices. Both of these items are controllable by external electric signals and, therefor can provide a variety of outputs. Hence, the switches can be controlled to provide "position" outputs. In addition, the video display devices can be controlled to provide a constantly changing display. In this regard both the switches and the displays have rapid response times because of the high Kerr constant of the organo-substituted carboranes employed. For this as well as other reasons, the video display device can be used in place of a cathode ray tube to provide a "thin" picture tube. In this regard the control system merely need translate conventional television signals into digital signals suitable for controlling the video display device of the invention.

The embodiments of the invention in which are exclusive property or privilege is claimed are defined as follows:

1. An optical switch comprising:
   a first transparent electrode;
   a second transparent electrode;
   an organo-substituted carborane material mounted between said first and second transparent electrodes in a manner such that a sandwich is formed between said organo-substituted carborane and said first and second transparent electrodes; and,
   a crossed polarizer, one of the elements of said crossed polarizer being located on one side of said sandwich and the other element of said crossed polarizer being located on the other side of said sandwich.

2. An optical switch as claimed in claim 1 wherein said organo-substituted carborane is 1-vinyl-o-carborane.

3. An optical switch as claimed in claim 1 wherein said organo-substituted carborane is 1-ethyl-o-carborane.

4. An optical switching system comprising:
   a beam of unpolarized light;
   an optical switch arrayed in said beam of unpolarized light, said optical switch comprising;
   a first transparent electrode;
   a second transparent electrode; and
   an organo-substituted carborane material mounted between said first and second transparent electrodes in a manner such that a sandwich is formed by said first and second electrodes and said organo-substituted carborane material;
   a crossed polarizer, one of the elements of said crossed polarizer being located on one side of said sandwich and the other element of said crossed polarizer being located on the other side of said sandwich; and,
   a power source connected to said first and second transparent electrodes.

5. An optical switching system as claimed in claim 4 wherein said organo-substituted carborane is 1-vinyl-o-carborane.

6. An optical switching system as claimed in claim 4 wherein said organo-substituted carborane is 1-ethyl-o-carborane.

7. A color-oriented video display device comprising:
   a first transparent electrode;
   a second transparent electrode;
   an organo-substituted carborane material mounted between said first and second transparent electrodes in a manner such that a sandwich is formed by said organo-substituted carborane material and said first and second transparent electrodes; and
   a crossed polarizer, one of the elements of said crossed polarizer being located on one side of said sandwich and the other element of said crossed polarizer being located on the other side of said sandwich.

8. A color-oriented video display device as claimed in claim 7 wherein said organo-substituted carborane is 1-vinyl-o-carborane.

9. A color-oriented video display device as claimed in claim 7 wherein said organo-substituted carborane is 1-ethyl-o-carborane.

10. A color-oriented video display device as claimed in claim 7 including a control system connected to said first and second transparent electrodes for selectively applying power to said first and second electrodes.

11. A color-oriented video display device as claimed in claim 10 wherein said organo-substituted carborane is 1-vinyl-o-carborane.

12. A color-oriented video display device as claimed in claim 10 wherein said organo-substituted carborane is 1-ethyl-o-carborane.

13. A color-oriented video display device as claimed in claim 10 wherein said first transparent electrodes is segmented into a plurality segments and wherein said control system is connected to said plurality of segments for selectively applying voltages to the separate segments of said plurality of segments.

14. A color-oriented video display device as claimed in claim 13 wherein said organo-substituted carborane is 1-vinyl-o-carborane.

15. A color-oriented video display device as claimed in claim 13 wherein said organo-subsituted carborane is 1-ethyl-o-carborane.

16. A color-oriented video display device as claimed in claim 13 wherein said organo-substituted carborane and said second transparent electrode are also formed of a plurality of segments each of which corresponds to the segments of said first transparent electrode.

17. A color-oriented video display device as claimed in claim 16 wherein said organo-substituted carborane is 1-vinyl-o-carborane.

18. A color-oriented video display device as claimed in claim 16 wherein said organo-subdtituted carborane is 1-ethyl-o-carborane.

* * * * *

UNITED STATES PATENT OFFICE
CERTIFICATE OF CORRECTION

Patent No. 3,711,180   Dated January 16, 1973

Inventor(s) Theodore J. Klingen and John R. Wright

It is certified that error appears in the above-identified patent and that said Letters Patent are hereby corrected as shown below:

1. On title page, inventor's name (Theodore J. Klinger), should be -- Theodore J. Klingen --

Signed and sealed this 29th day of May 1973.

(SEAL)
Attest:

EDWARD M. FLETCHER, JR.
Attesting Officer

ROBERT GOTTSCHALK
Commissioner of Patents